United States Patent Office 2,937,122
Patented May 17, 1960

2,937,122

PRODUCTION OF L-THREONINE

Hsing T. Huang, Fresh Meadows, N.Y., assignor to Chas. Pfizer & Co., Inc., New York, N.Y., a corporation of Delaware No Drawing. Application March 10, 1958
Serial No. 720,004

5 Claims. (Cl. 195—47)

This invention is concerned with a fermentation process for the production of L-threonine. More particularly, it is concerned with the production of L-threonine by the cultivation of an *E. coli* mutant.

L-threonine is an essential amino acid which is useful in human nutrition, nutriton studies and also in the synthesis of peptides which is of considerable biological interest. L-threonine is also important in the preparation of artificial maple flavor as described in U.S. Patent 2,446,478 wherein is described a process for the preparation of artificial maple flavor by reaction of threonine with a suitable reducing saccharide or precursors thereof.

Although threonine may be prepared by chemical synthetic methods and numerous articles are found describing such methods, the synthetic product is generally a mixture of the diastereoisomers, D,L-threonine and D,L-allothreonine. The diastereoisomers must first be separated by fractional crystallization and additional chemical reactions applied to D,L-allothreonine to convert it to D,L-threonine. Finally, L-threonine is obtained from D,L-threonine by resolution methods familiar to those in the art. Davis has reported in Nature, vol. 169, page 534 (1952) that a diaminopimelic acid-requiring auxotroph of *E. coli* produced detectable amounts of L-threonine.

It has now been found that an auxotrophic mutant of *E. Coli* which requires diaminopimelic acid and L-methionine for growth accumulates appreciable quantities of L-threonine when cultivated in certain nutrient media. A living culture of this double auxotroph of *E. coli* has been deposited in the American Type Culture Collection, Washington, D.C., where it has been assigned the number ATCC 13070. Such an auxotroph may be obtained by ultraviolet treatment followed by selection with penicillin of a wild strain of *E. coli*. This procedure is well known to those skilled in the art and commonly employed in the development and isolation of bacterial mutants.

The present invention provides an economical and practical method of preparing L-threonine which is amenable to large scale commercial production. A major advantage of the present fermentation process lies in the fact that L-threonine is selectively produced thus avoiding the mixtures of optical isomers produced by the chemical synthetic route. The process of the present invention is accomplished by the aerated deep tank, i.e. submerged, fermentation of *E. coli*, ATCC 13070, in nutrient media. Such nutrient media usually comprise a carbon source, a source of nitrogen, and a source of metallic ions required for the organism's growth, for example, potassium and magnesium ions.

The hexitols, mannitol and sorbitol, are found to be particularly suitable carbon sources. Sorbitol is found to be a particularly effective source of carbon, best yields being obtained when it is employed in the nutrient media. When carbon sources other than sorbitol and mannitol are used appreciably lower yields of the amino acid, L-threonine, may be obtained.

As mentioned above, the double auxotroph of this invention requires diaminopimelic acid and L-methionine for its growth. By diaminopimelic acid and L-methionine as used herein is meant the amino acids themselves or the nontoxic acid addition salts such as the hydrohalide salts for example, the hydrochloride or hydrobromide. D,L-methionine also serves as an effective source of L-methionine in the fermentation medium. The organism accumulates optimum yields of L-threonine in the presence of about 150 to about 250 mg. of diaminopimelic acid and from about 15 to about 100 mg. of L-methionine per liter of nutrient medium. Usually best results are obtained when employing from about 20 to about 30 g. of hexitol per liter of nutrient media. The use of other concentrations of hexitol may lead to reduced yields.

Appreciably higher yield of L-threonine may be obtained by the addition of certain other constituents to the nutrient medium. When sucrose or crude beet molasses are added to the nutrient medium at concentrations of from about 5 to about 20 g. per liter, a significant increase in yield of the essential amino acid is noted. For example, when crude beet molasses is added to the nutrient medium at a concentration of about 10 grams per liter an increase of about 50% in the yield of L-threonine is obtained. The increase in yield obtained with sucrose is generally less than with crude beet molasses, increases of up to about 30% being obtained. However, cornsteep liquor together with sucrose is found to be as effective as beet molasses. Employing sucrose and cornsteep liquor at respective concentrations of from about 5 to about 20 grams and from about 1 to about 5 grams per liter of nutrient medium is found to give yields of the desired product corresponding to those obtained with the above specified concentrations of beet molasses.

As is known in the art the organism requires certain metallic ions for its growth particularly potassium and magnesium which may be conveniently incorporated in the nutrient medium in the form of suitable soluble salts, for example, potassium acid phosphates and magnesium sulfate respectively. Various trace metals, for example, iron, cobalt, nickel, zinc and so forth are also required for the organism's growth and may be incorporated into the nutrient medium by the addition of a premix of a suitable soluble form of these metallic ions or preferably the use of tap water which contains these required ions for the preparation of the nutrient medium.

The fermentation may be carried out at the usual fermentation temperatures, generally a temperature of from about 20° to about 40° C. although preferably from about 25° to about 30° C. The fermentation is usually effected at a pH of from about 6 to about 8 and the medium preferably aerated at a rate of from ½ to 2 volumes of air per volume of medium per minute and stirred vigorously. The optimum time for the process may be conveniently determined by paper chromatographic analysis of the L-threonine content of the reaction mixture, a procedure which is commonly employed in fermentation processes. Generally time periods of from about 40 to about 48 hours give best results.

After the reaction is complete, the fermentation mixture assays at from about 2 to 3 g. of L-threonine per liter of nutrient medium. It is found that in addition to threonine the fermentation medium contains small amounts of glycine, and trace quantities of serine and glutamic acid.

L-threonine may be isolated from the fermentation medium by standard procedures such as ion exchange methods, for example, the L-threonine may be recovered by adjusting the pH of the medium to about 2 with hydrochloric acid, filtering and passing the filtrate through a strong cation exchange resin such as sulfonic acid resin, Amberlite IR-120 (Rohm & Haas Co.). After washing with water, the product is eluted with dilute ammonium hydroxide, the eluate freed of ammonia by heating and the pure amino acid obtained by fractional crystallization.

Alternatively, the product may be absorbed on a strong cation exchange resin such as sulfonic acid resin Permutit Q (The Permutit Co., a division of Pfaudler Permutit Inc.). The resin is then washed with dilute (0.1 to 0.5 molar) ammonium hydroxide, L-threonine being eluted first. The constituency of the eluate may be determined by paper chromatographic analysis and the cuts containing threonine concentrated and crystallized. The remaining eluate cuts contain glycine, serine and glutamic acid which may be obtained by conventional procedures such as concentration and crystallization.

L-threonine as obtained from the fermentation medium is characterized by paper chromatography, specific rotation and microbiological analysis with *Leuconostoc mesenteroides* P–60 by standard procedures described in the literature, for example, "The Microbiological Assay of Vitamin B Complex and Amino Acids," by F. C. Barton Wright, Pitman & Sons, London (1952).

The following examples are given by way of illustration and are not to be construed as limitations of this invention many variations of which are possible within the scope and spirit thereof.

*Example I*

E. coli, ATCC 13070, was inoculated from an agar slant into 1 liter of an inoculum previously sterilized at 20 pounds/square inch for 30 minutes having the following composition:

| | |
|---|---|
| $K_2HPO_4$ | g./l__ 7 |
| $KH_2PO_4$ | g./l__ 3 |
| Trisodium citrate | g./l__ 0.4 |
| $MgSO_4.7H_2O$ | g./l__ 0.1 |
| $(NH_4)_2SO_4$ | g./l__ 0.1 |
| Glycerol | g./l__ 10 |
| D,L-methionine | mg./l__ 200 |
| Diaminopimelic acid (hydrochloride) | mg./l__ 50 |

The inoculum was incubated for 16 hours at 27° C. in a Fernbach flask. A production medium was prepared having the following composition:

| | |
|---|---|
| $K_2HPO_4$ | g./l__ 5 |
| $(NH_4)_2HPO_4$ | g./l__ 10 |
| $MgSO_4.7H_2O$ | g./l__ 0.5 |
| Sorbitol (70% aqueous solution) | g./l__ 25 |
| D,L-methionine hydrochloride | mg./l__ 50 |
| Diaminopimelic acid | mg./l__ 175 |

Fifty milliliters of the inoculum was added to 2 liters of the production medium in a fermenter flask previously sterilized by autoclaving for 20 pounds/square inch for 35 minutes. The broth was stirred at 1750 revolutions/minute and aerated at a rate of 1 volume of air per volume of reaction medium per minute at a temperature of 28° C. After 40 hours, the mixture assayed at 2.0 grams per liter of L-threonine which was isolated by ion-exchange treatment.

*Example II*

E. coli, ATCC 13070, was inoculated from an agar slant into 1 liter of an inoculum as described in Example I.

One hundred milliliters of this inoculum was added to 2 liters of a production medium in a fermenter having the following composition:

| | |
|---|---|
| $K_2HPO_4$ | g./l__ 5 |
| $(NH_4)_2HPO_4$ | g./l__ 10 |
| $MgSO_4.7H_2O$ | g./l__ 0.5 |
| Sorbitol | g./l__ 30 |
| Diaminopimelic acid (hydrochloride) | mg./l__ 150 |
| D,L-methionine | mg./l__ 60 |
| Sucrose | g./l__ 10 |
| Cornsteep liquor | g./l__ 2 |

The mixture was stirred and aerated as in Example I at 28° C. After 48 hours, the mixture assayed at 3 grams per liter of L-threonine which was obtained by ion-exchange treatment.

*Example III*

The process of Example II was repeated employing 10 grams of crude beet molasses per liter of nutrient medium in place of sucrose and cornsteep liquor. After 40 hours the mixture assayed at 3 grams per liter of L-threonine which was obtained by ion-exchange treatment.

*Example IV*

The procedure of Example II was repeated employing 10 grams per liter of sucrose in place of sucrose and cornsteep liquor. After 48 hours, the mixture assayed at 2½ grams per liter of L-threonine which was obtained by ion exchange treatment.

*Example V*

A production medium was prepared having the following composition:

| | |
|---|---|
| $K_2HPO_4$ | g./l__ 5 |
| $(NH_4)_2HPO_4$ | g./l__ 10 |
| $MgSO_4.7H_2O$ | g./l__ 0.5 |
| Sorbitol | g./l— 20 |
| Diaminopimelic acid | mg./l__ 200 |
| L-methionine (hydrochloride) | mg./l__ 30 |
| Sucrose | g./l__ 20 |
| Cornsteep liquor | g./l__ 5 |

The medium was inoculated with 50 milliliters of the inoculum prepared in Example I. The mixture was stirred and aerated at 28° C. After 48 hours, the mixture assayed at 2.8 grams per liter of L-threonine.

*Example VI*

The procedure of Example V was repeated employing 5 grams of sucrose and 1 gram of cornsteep liquor with comparable results.

*Example VII*

The procedure of Example III was repeated employing 20 grams per liter of crude beet molasses with comparable results.

*Example VIII*

The procedure of Example IV was repeated employing 20 grams of sucrose. After 48 hours the mixture assayed at 2.3 grams per liter of L-threonine which was obtained by ion exchange treatment.

*Example IX*

The procedure of Example IV was repeated employing 5 grams per liter of sucrose with comparable results.

*Example X*

The procedure of Example I was repeated employing mannitol in place of sorbitol and 15 mg. of L-methione in place of D,L-methionine hydrochloride. After 40 hours, the mixture assayed at 1.2 grams per liter of L-threonine.

*Example XI*

The procedure of Example V was repeated employing 100 mg. of L-methionine with comparable results.

What is claimed is:

1. A process for the preparation of L-threonine which process comprises cultivating under submerged aerobic conditions at a pH of from about 6 to about 8 E. coli, ATCC 13070, in an aqueous nutrient medium comprising a hexitol selected from the group consisting of sorbitol and mannitol, a source of nitrogen, a source of magnesium, a source of potassium and trace metals in the presence of from about 150 to about 200 mg. of diaminopimelic acid and from about 15 to 100 mg. of L-methionine per liter of nutrient medium.

2. A process as claimed in claim 1 in which from about 20 to about 30 grams of hexitol per liter of nutrient medium is employed.

3. A process as claimed in claim 1 in which from about 5 to about 20 grams of sucrose and from about 1 to about 5 grams of cornsteep liquor per liter of nutrient medium are added.

4. A process as claimed in claim 1 in which from about 5 to about 20 grams of crude beet molasses per liter of nutrient medium is added.

5. A process as claimed in claim 1 in which from about 5 to about 20 grams of sucrose per liter of nutrient medium is added.

References Cited in the file of this patent
UNITED STATES PATENTS 2,771,396    Casida _____ Nov. 20, 1956
2,841,532    Kita et al. _____ July 1, 1958

OTHER REFERENCES

Nature, vol. 169, pp. 534 to 536 (1952).
Journal of Bacteriology, vol. 67, pp. 182 to 190 (1954).